United States Patent [19]

Chang et al.

[11] 4,230,844

[45] Oct. 28, 1980

[54] PROCESSES FOR THE PREPARATION OF POLYMERIC THICKENERS AND USES THEREOF

[75] Inventors: David C. Chang, Springfield; Michael Fryd, Philadelphia, both of Pa.; Achim R. Krueger, Cherry Hill, N.J.

[73] Assignee: E. I. Du Pont de Nemours and Company, Wilmington, Del.

[21] Appl. No.: 946,715

[22] Filed: Sep. 28, 1978

Related U.S. Application Data

[60] Continuation of Ser. No. 770,364, Feb. 22, 1977, abandoned, which is a division of Ser. No. 643,390, Dec. 22, 1975, abandoned, which is a continuation of Ser. No. 525,008, Nov. 18, 1974, abandoned, which is a continuation-in-part of Ser. No. 416,200, Nov. 15, 1973, abandoned.

[51] Int. Cl.$^3$ ............................ C08F 2/06; C08F 2/10
[52] U.S. Cl. .................... 526/210; 260/29.6 E; 260/29.6 MN; 260/33.4 R; 525/375; 525/378; 525/379; 525/380
[58] Field of Search ............ 526/49, 50, 210; 260/33.4 R, 29.6 MN, 29.6 E; 525/375, 378, 379, 380

[56] References Cited

U.S. PATENT DOCUMENTS

| | | | |
|---|---|---|---|
| 3,352,806 | 11/1967 | Hicks | 260/29.4 |
| 3,399,152 | 8/1968 | Jamrog et al. | 260/17 |
| 3,652,497 | 3/1972 | Jonas et al. | 260/47 UA |
| 3,708,445 | 1/1973 | Jonas et al. | 260/4 R |
| 3,862,075 | 1/1975 | Sekmakas | 260/29.6 E |
| 3,891,591 | 6/1975 | Chang et al. | 260/29.6 WB |
| 4,138,381 | 2/1979 | Chang et al. | 526/210 |

Primary Examiner—Stanford M. Levin

[57] ABSTRACT

Processes for preparing polymeric thickeners are provided which give, in preferred compositions, both good flow and leveling properties as well as sag resistance to coating compositions such as aqueous paints. The thickeners are prepared by conducting the polymerization in glycol such as ethylene glycol or propylene glycol with or without a little added water. The monomers polymerized consist essentially of (a) about 1–99% by weight of at least one unsaturated carboxylic acid of 3 to 6 carbon atoms, and (b) about 99–1% by weight of at least one ester of the formula

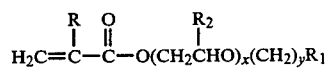

wherein
R and $R_2$ are each hydrogen or methyl,
x is a positive integer of 5 to 80,
y is an integer of 0 to 20, and
$R_1$ is alkyl of 1 to 20 carbon atoms or alkyl phenyl where the alkyl group is from 1 to 20 carbon atoms.

1 Claim, No Drawings

PROCESSES FOR THE PREPARATION OF POLYMERIC THICKENERS AND USES THEREOF

CROSS REFERENCE TO RELATED APPLICATIONS

This is a continuation of copending application Ser. No. 770,364, filed Feb. 22, 1977, which is a division of application Ser. No. 643,390 filed Dec. 22, 1975, which in turn is a continuation of application Ser. No. 525,008, filed Nov. 18, 1974, which in turn, is a continuation-in-part of application Ser. No. 416,200, filed Nov. 15, 1973, all abandoned.

BACKGROUND OF THE INVENTION

1. Field of Invention

This invention relates to processes for preparing polymeric materials, and aqueous coating compositions containing the polymeric materials.

2. Prior Art

In recent years, latex paints, i.e., paints based on aqueous dispersions of synthetic organic polymers, have come into widespread use because they can be easily applied, easily cleaned from brushes and rollers, and because they are generally free of objectionable odor. Materials known as thickeners are commonly used in latex paints, as well as a variety of other coating compositions, to provide thickening effects. An effective thickener should be used in a minimum amount and should not affect the basic properties of the aqueous coating composition in which it is used.

There are many types of thickeners now used in paints and other coating compositions. Water-soluble materials employed as thickeners include natural gums and resins, such as starch, gum arabic, modified starch products, dextrins, sodium alginates, gums, such as tragacanths and other such compounds. Synthetic materials employed as thickeners include carboxymethylcellulose, polyvinyl alcohol, polyacrylamide, polyacrylic acids and salts thereof, methylcellulose and other cellulose derivatives such as carboxymethylcellulose and hydroxyethylcellulose; polyvinylpyrrolidone, polyvinylmethylether, polyethyleneoxides and copolymers of polyvinylmethylether and maleic anhydride. Thickeners of the polyelectrolyte type function primarily due to adsorption and include synthetic polymeric water-soluble thickeners such as the sodium polyacrylates as well as the copolymers of various acrylates, such acrylic thickeners being described more particularly in U.S. Pat. Nos. 2,883,351, 2,956,046, 3,035,004 and 3,436,378.

Water-soluble polyelectrolyte copolymers employed as thickeners include those esters prepared by the esterification reaction between the acid anhydride groups of a copolymer of an alkylvinylether and maleic anhydride with the terminal hydroxyl groups of a nonionic surfactant of an alkylphenoxyethoxyethanol polymer. The resulting water-soluble polymer is a partial ester which contains free acid groups suitable for subsequent neutralization with a basic material, such as an amine or a metal oxide or hydroxide. The water-soluble polymeric esterification materials are employed as emulsion stabilizers, thickeners and film formers. Interpolymers prepared by the reaction of maleic anhydride with vinyl monomers, which interpolymers are useful as thickeners, are described in U.S. Pat. No. 3,499,876, issued Mar. 10, 1970.

Water-soluble, polymeric surfactant thickeners comprising a copolymer of an ester of an alkylarylpolyether alcohol with an unsaturated carboxylic acid compound are described in U.S. Pat. No. 3,708,445, issued Jan. 2, 1973, to Thomas B. Junas et al. While the specification describes these copolymers as containing 70 to 95% of the ester and 5 to 30% of the acid, the examples appear to be suggesting copolymers of 70 to 95% acid and 5 to 30% of the ester.

SUMMARY OF THE INVENTION

According to the present invention there is provided a process for preparing a polymer useful as a thickening agent in aqueous polymeric latices comprising:

(a) adding to a reaction zone a portion of the monomers and sufficient glycol, with 0 to about 50% by weight of water based on the weight of glycol, to give a final product having a solids content less than about 50% by weight, said monomers consisting essentially of (i) about 1–99% by weight of at least one unsaturated carboxylic acid of 3 to 6 carbon atoms, and (ii) about 1–99% by weight of at least one ester of the formula

wherein
R and $R_2$ are each hydrogen or methyl,
x is a positive integer of 5 to 80,
y is an integer of 0 to 20, and
$R_1$ is alkyl of 1 to 20 carbon atoms or alkyl phenyl where the alkyl group is from 1 to 20 carbon atoms;

(b) heating the mixture of (a) to a temperature of at least about 50° C.;

(c) adding to the reaction zone a portion of a free-radical polymerization catalyst; and (d) feeding to the reaction zone the remainder of the monomers and catalyst.

There is also provided an aqueous coating composition wherein a thickening amount of the polymer prepared by the above process is added to a polymeric latex, preferably containing a filler, a pigment and the like.

DETAILED DESCRIPTION OF THE INVENTION

The present invention provides a process for preparing polymeric thickeners which, when added to coating compositions such as latex paints, will give good flow and leveling after shear and will have good sag resistance. Applicants have found that soluble polymers containing a high ester content can be prepared if the polymerization is conducted in glycol.

The polymeric thickening agent prepared consists essentially of (i) about 1–99% by weight (preferably about 30–80%, most preferably about 30–65%) of at least one unsaturated carboxylic acid of 3 to 6 carbon atoms, and (ii) about 99–1% by weight (preferably about 70–20%, most preferably about 70 to 35%) of at least one ester of the formula:

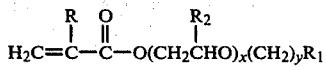

wherein
R and $R_2$ are each hydrogen or methyl, x is a positive integer of 5 to 80,
y is 0 or a positive integer of 1 to 20, and
$R_1$ is alkyl of 1 to 20 carbon atoms or alkyl phenyl where the alkyl group is from 1 to 20 carbon atoms.

Useful unsaturated carboxylic acid monomers are ethylenically unsaturated and include mono and dicarboxylic acids such as acrylic acid, methacrylic acid, itaconic acid, maleic acid, fumaric acid, crotonic acid, angelic acid, glutaconic acid and the like. Half-esters of the dicarboxylic acids with alkanols (preferably $C_1$-$C_8$) can also be used. Acrylic acid and methacrylic acid are especially preferred.

Some of the ester monomers used in the polymeric thickener are commercially available. Generally, the ester monomers can be prepared as described in U.S. Pat. No. 3,708,445 using alcohols and acids described in column 3, lines 36–75. Transfer esterification, as is well known in the art, can also be used.

A preferred ester has the formula:

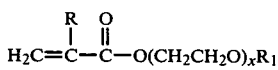

wherein
R is hydrogen or methyl,
x is a positive integer of 5 to 80, preferably 10 to 50, and
$R_1$ is alkyl of 1 to 15 carbon atoms or alkyl phenyl where the alkyl group is from 8 to 20 carbon atoms, preferably

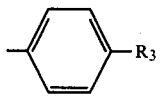

where $R_3$ is alkyl of 8 to 20 carbon atoms.
Generally, the higher the ester content in the polymer, the better the flow in the final coating composition.

Particularly preferred polymeric thickeners use methacrylic acid and an acrylate of the formula:

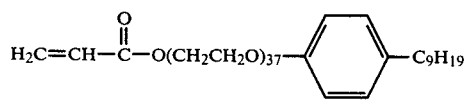

as monomers.

The polymeric thickeners prepared by the process of the invention have a number of advantages. They are stable, compatible, high efficiency thickeners for latex systems. Thickener properties can be controlled through compositional variation and solvent modification. Tailoring the thickeners will provide the latex systems with desirable balance of application properties. For example, the high shear rate viscosity (controls film build and brush drag), the medium shear rate viscosity (controls brush load and dripping) and low shear rate viscosity (controls flow and leveling and sag resistance) can be adjusted to the desirable range depending on the type of latex, e.g., paint, prepared, i.e., wall paint, house paint, trim paint, etc. A high shear rate is greater than 5,000 sec.$^{-1}$, a medium shear rate is in the range of 50–300 sec.$^{-1}$ and a low shear rate is lower than 10 sec.$^{-1}$.

The polymeric thickeners are prepared by polymerizing the monomers under an inert atmosphere, such as nitrogen, with a typical free-radical catalyst in glycol such as ethylene glycol, propylene glycol (both 1,2 and 1,3), glycerol, diethylene glycol, triethylene glycol, tetraethylene glycol and other polyethylene glycols. Other glycols such as monoalkyl ether glycols, where the alkyl group is from 1 to 4 carbon atoms such as the cellosolves can be used. Cellosolve derivatives such as cellosolve acetate can also be used. Of these, propylene glycol is preferred. Up to 50% by weight of the glycol (preferably up to 30%) can be replaced by water. For some unknown reason, the use of added water in the process produces a polymeric thickener that lowers brush drag when the thickener is used in paints. Latex systems such as paints incorporating the thickeners of the same composition but prepared through this solvent modification, will have different high shear viscosity and/or low shear rate viscosity while the medium shear rate viscosity stays at about the same level.

The process is specifically carried out by adding a portion of the monomers (preferably about 10 to 50% by weight of the total amount of monomers) to a reaction vessel containing the glycol with or without added water. Sufficient glycol is used in order to give a final polymer concentration of less than 50% by weight, preferably less than about 35%. The final polymer concentration range will usually be between 5 to 35% by weight.

The reaction mixture in the vessel is then heated to a temperature of at least 50° C. before the free-radical catalyst is added. Of course, the temperature cannot be higher than the boiling point of the glycol used or the glycol-water azeotrope. It is preferred that the temperature be between 70° and 110° C.

While any convenient free-radical catalyst can be used, preferred catalysts are of the azo type such as azodiisobutyronitrile, azobisdimethylvaleronitrile, azobisisobutyronitrile, azodiisobutyramide, azobis($\alpha$-ethylbutyronitrile) or azobis($\alpha,\gamma$-dimethylcapronitrile). Other free-radical catalysts such as organic hydroperoxides and peroxides can be used. Illustrative hydroperoxides are t-butyl hydroperoxide, cume hydroperoxide, diisopropylbenzene hydroperoxide, p-menthane hydroperoxide, pinane hydroperoxide and other t-alkyl hydroperoxide. Some useful peroxides are benzoyl peroxide, acetyl peroxide, lauroyl peroxide, di-t-butyl perphthalate, t-butyl perbenzoate and methyl ethyl ketone peroxide. While high energy radiation sources, such as ultraviolet light, x-rays or gamma-rays, can be used, they are not preferred. Initially, only a portion of the total catalyst (preferably about 10 to 50% by weight) is added to the initial charge of monomers.

After polymerization has been initiated, the remainder of the monomers (either separately or as a mixture) and catalyst are continuously fed into the reaction vessel at a constant rate which depends upon volume and time. Constant temperature is maintained either by heating or cooling as the case may be. Generally, the reaction time will be between 1 to 3 hours at the preferred temperatures.

After the addition of the monomers and catalyst is completed, a small amount (typically about 0.6%) of catalyst is added to insure complete polymerization. Heating of the reaction mixture is continued for about another 1 to 4 hours, after which it is cooled.

The pH of the reaction mixture after polymerization will be around 6 or below. Where desired, such as when the polymeric thickeners are to be added to paints or other compositions of high pH, the pH of the reaction mixture is adjusted by adding a basic material to the segregated polymer per se or to the reaction mixture. Usually the pH will be adjusted to pH 7 to 10 by the addition of ammonia with or without additional water depending upon the polymer and solvent compositions. However, other bases which are water-soluble, such as a metal oxide or hydroxide, e.g., alkali metal or alkaline earth metal hydroxides and ammonium hydroxide, can be used. Another preferred base besides ammonia is a volatile nitrogenous base having a vapor pressure greater than about $1 \times 10^{-4}$ millimeters of mercury at 25° C. such as monoethanolamine, diethanolamine, propanolamine, morpholine, pyrrolidine or piperidine. Ammonia is especially preferred for its volatility and low cost.

The polymers prepared by the process of the invention or their solutions thereof are used as thickeners for controlling the viscosity of polymeric latices of natural or synthetic water-insoluble polymers. Illustrative polymeric latices are dispersions, emulsions, suspensoids and the like of the following polymers: acrylics, vinyl acetate homopolymers or copolymers, styrene-butadiene, carboxylated styrene-butadiene, polystyrene, polyvinyl alcohol, natural rubber, vinyl chloride homopolymers and copolymers, chloroprene, polyacrylonitrile, acrylonitrile-butadiene and butyl rubber. More particular polymers are homopolymers and copolymers of acrylonitrile with a diene like isoprene, butadiene or chloroprene; homopolymers of styrene, homopolymers and copolymers of vinyl halide resins like vinyl chloride, vinylidene chloride, with each other or acrylonitrile or vinyl esters such as vinyl acetate; vinyl acetate homopolymers and copolymers with ethylene and acrylates; copolymers of styrene and unsaturated acid anhydrides like maleic anhydrides; homopolymers and copolymers of acrylic and methacrylic and their esters and derivatives; polybutadiene; polyisoprene; ethylenepropylene copolymers; olefinic resins like polyethylene, polypropylene; polyvinyl alcohol; carboxylated natural and synthetic latices and similar polymeric materials. Acrylic polymer latices are preferred. An amount of thickener sufficient to give a thickening effect is used. Generally, the concentration of thickener will be between 0.1 and 10% by weight of the solids, preferably between 0.1 and 5% and most preferably less than 1%.

The thickener prepared by the process of the invention is particularly useful in improving the sag resistance and flow and leveling of aqueous polymeric latices and latex paints, particularly those acrylic paints described in U.S. Pat. Nos. 3,309,331, issued Mar. 14, 1967 to McDowell and Hill and U.S. Pat. No. 3,687,885, issued Aug. 29, 1972 to Abriss and McDowell. The disclosures of these patents with respect to particularly useful acrylic polymeric dispersions are hereby incorporated by reference.

In preparing coating compositions, particularly paints, pigments as well as other conventional paint ingredients can be added to the coating compositions of the invention. Conventional pigments can be used either alone or in combination. Illustrative are rutile titanium dioxide, anatase titanium dioxide, carbon black, lamp black, finely divided kaolin clays, chrome yellow, chrome green, black iron oxide, "Monastral" green pigment, "Monastral" blue pigment, "Dalamar" yellow pigment, lithopone and the like. These pigments can be extended with conventional extenders such as diatomaceous silica, calcium carbonate, barium sulfate, talc, various clays, mica and the like.

Other conventional adjuncts can also be added to the coating compositions. For example, glycols such as ethylene glycol or propylene glycol can be added to paints at concentrations of up to 30% by weight, to increase their wet-edge time and to further improve their lapping characteristics. The glycol can be added directly to the paint or it can be carried over from the preparation of the polymeric thickener. In other words, when glycol is used in the paint, there is no need to separate the polymeric thickener from the glycol reaction medium. Defoamers, pigment dispersants, microbiocides, other thickeners and the like, in the usual amounts.

The invention can be further illustrated by the following examples in which parts and percentages are by weight unless otherwise indicated.

EXAMPLE 1

A polymeric thickener of the composition 50% methacrylic acid and 50% of an acrylic ester of the formula

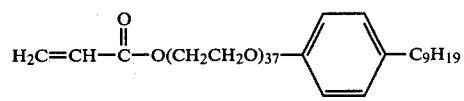

(NPEOA) was prepared as follows:

| | Ingredients | Parts by Weight |
|---|---|---|
| Charge 1: | Propylene glycol | 1485 |
| | Water | 386 |
| Charge 2: | Methacrylic acid (MAA) | 163 |
| | NPEOA | 163 |
| | Propylene glycol | 57 |
| Charge 3: | Azobisisobutyronitrile | 1.11 |
| | Acetone | 7.89 |
| Charge 4: | Azobisisobutyronitrile | 2.22 |
| | Acetone | 15.80 |
| | | 2281.02 |

Charge 1 was placed in a 3-liter 3-neck flask equipped with stirrer, condenser, thermometer, nitrogen gas inlet and outlet and an addition funnel. Charge 1 was blanketed with nitrogen and heated to about 94° C. One-fourth of Charge 2 and one-fourth of Charge 3 were added and the temperature held for about 5 minutes. The remainder of Charges 2 and 3 were mixed and fed at a constant rate over a period of 80 minutes and then held at 94° C. for 15 minutes.

Charge 4 was then added in four equal portions at 30 minute intervals. The flask ingredients were cooled and discharged.

To 300 parts of the above composition was added 25 parts of a 30% ammonia solution to give a final solution product having a pH of about 9.8.

A flat paint was prepared having the following approximate composition:

| Ingredients | % by Weight |
|---|---|
| Anatase TiO$_2$ | 4.7 |
| Rutile TiO$_2$ | 22.1 |
| Magnesium silicate | 8.2 |
| Mica | 8.2 |
| Thickener of Example 1 | 0.4 |
| Anionic surfactant (Nopco ® 1497-V) | 0.21 |

| -continued | |
|---|---|
| Ingredients | % by Weight |
| Binder MMA/2EHA/MAA[1] 44/54/2 | 11.3 |
| Potassium tripolyphosphate | 0.13 |
| Defoamer (DeeFo® 495) | 0.05 |
| Preservative with 1,2-benzisothiazolin-3-one | 0.01 |
| Nonionic surfactant[2] | 0.4 |
| Sodium polycarboxylate (Tamol® 850) | 0.1 |
| Ammonia | 0.4 |
| Water | 41.3 |
| Ethylene glycol | 2.5 |
| | 100.00 |

[1]MMA = methyl methacrylate
2EHA = 2-ethylhexyl acrylate
MAA = methacrylic acid

[2] 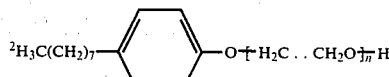

where n is mixture about 9-10 and about 45.

The resulting paint had about 56% solids and a pigment volume concentration (PVC) of about 52. The pH was about 9.5.

The paint had a consistency of 97 K.U. (Krebs Units) when measured by a Stormer as set forth in ASTM D-562-55. The viscosity, in poises, of the paint was measured at various shear rates on an ICI Cone and Plate Viscometer for 16,000 sec.$^{-1}$ and on a Rotavisco MV-1 for the others. Results of the tests are shown in Table I.

TABLE I

| Shear Rate Sec.$^{-1}$ | Viscosity Poises |
|---|---|
| 16,000 | 0.55 |
| 300 | 4.7 |
| 75 | 9.0 |
| 10 | 25.0 |
| 1 | 85.0 |
| 0.2 | 240.0 |

EXAMPLES 2-5

Following the thickener preparation procedure of Example 1, thickeners were prepared and formulated into the flat paint of Example 1. For Example 3, the water was brought in through the ester monomer at a 50% aqueous solution. For controls, various standard thickeners were formulated into the flat paint of Example 1 at about the same concentration. For Example, Control A used methocel, Control B used "Thickener LN" (sold by GAF Corp.) which is stated to be the ammonium salt of the partial ester of 2 parts of methylvinyl ether/maleic anhydride 1/1 copolymer and 1 part of polyoxyethylated lauryl alcohol having 16 moles of ethylene oxide units per mole of alcohol units, and Control C used a commercial thickener sold by General Latex and Chemical Corp. under the tradename "Vultex" T-60 which is believed to be a thickener of the type described in U.S. Pat. No. 3,708,445.

The thickener composition, the solvent used in preparation and the paint viscosity-shear rate data are shown in Table II.

TABLE II

| Example No. | Thickener Composition | | | Solvent | K.U. | Viscosity-Poises at Various Shear Rates | | | | | |
|---|---|---|---|---|---|---|---|---|---|---|---|
| | MAA | NPEOA | MPEOA* | | | 16M | 300 | 75 | 10 | 1 | 0.2 |
| 2 | 25 | 75 | — | Prop.gly.& 25% H$_2$O | 98 | 0.5 | 3.2 | 9 | 23 | 80 | 230 |
| 3 | 50 | — | 50 | Prop.gly.& 9% H$_2$O | 97 | 0.8 | 2.7 | 6.4 | 26 | 150 | 650 |
| 4 | 25 | 75 | — | Prop.gly. | 99 | 0.5 | 4.1 | 10 | 32 | 120 | 430 |
| 5 | 50 | 50 | — | Eth.gly. | 98 | 0.6 | 4.2 | 9 | 23 | 80 | 190 |
| Control A | — | — | — | — | 104 | 0.8 | 4.4 | 10 | 38 | 200 | 750 |
| Control B | — | — | — | — | 98 | 0.8 | 6.5 | 10.5 | 22 | 50 | 70 |
| Control C | — | — | — | — | 108 | 0.9 | 6 | 12.5 | 40 | 160 | 500 |

*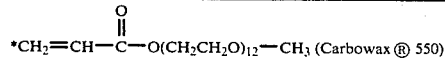 (Carbowax® 550)

EXAMPLES 6-10

The thickeners of Examples 1-5 and methocel (Control D) were formulated into a semi-gloss paint having the following approximate composition:

| Ingredients | % by Weight |
|---|---|
| Rutile TiO$_2$ | 27.5 |
| Thickener | 0.6 |
| Tributyl phosphate | 0.2 |
| Binder MMA/2EHA/MAA/AEMA[1] 47.5/49.5/2.5/0.5 | 16.2 |
| Potassium tripolyphosphate | 0.2 |
| Defoamer (DeeFo® 495) | 0.05 |
| Preservative (a zinc pyridine thione) | 0.01 |
| Gelling agent (Colloids 581-B) | 0.2 |
| Non-ionic surfactant[2] | 0.2 |
| Sodium polycarboxylate | 0.21 |
| Ammonia | 0.6 |
| Water | 46.33 |
| Propylene glycol | 7.7 |
| | 100.00 |

[1]AEMA = aminoethylmethacrylate
[2]Surfactant of Example 1 where n is 9-10.

The resulting paint had about 45% solids, a PVC of about 30 and a pH of about 9.5.

The paint viscosity-shear rate data is shown in Table III.

TABLE III

| Example No. | Thickener Used | K.U. | Viscosity-Poises at Various Shear Rates | | | | | |
|---|---|---|---|---|---|---|---|---|
| | | | 16M | 300 | 75 | 10 | 1 | 0.2 |
| 6 | Ex. 1 | 106 | 0.9 | 7.8 | 14 | 33 | 80 | 190 |
| 7 | Ex. 2 | 100 | 0.68 | 14 | 26 | 48 | 200 | 800 |
| 8 | Ex. 3 | 97 | 0.6 | 2 | 46 | 18 | 130 | 630 |
| 9 | Ex. 4 | 114 | 2.2 | 10 | 15 | 27 | 41 | 70 |
| 10 | Ex. 5 | 118 | 1.6 | 10 | 18 | 32 | 68 | 140 |

TABLE III-continued

| Example No. | Thickener Used | K.U. | Viscosity-Poises at Various Shear Rates | | | | |
|---|---|---|---|---|---|---|---|
| | | | 16M | 300 | 75 | 10 | 1 | 0.2 |
| D | — | 110 | 0.69 | 5.5 | 13 | 41 | 330 | 1200 |

What is claimed is:

1. A process for preparing a polymer useful as a thickening agent in aqueous polymeric latices comprising:
   (a) adding to a reaction zone about 10 to 50% by weight of the total of the monomers and sufficient ethylene glycol or propylene glycol, with 0 to about 50% by weight of water based on the weight of glycol, to give a final product having a solids content between 5 and 35% by weight, said monomers consisting essentially of (i) about 30–65% by weight of acrylic acid or methacrylic acid, and (ii) about 70–35% by weight of an ester of the formula

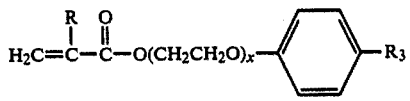

wherein
   R is hydrogen or methyl,
   x is a positive integer of 10 to 50, and
   $R_3$ is an alkyl group of 8 to 20 carbon atoms;
   (b) heating the mixture of (a) to a temperature in the range of about 70° to 110° C.;
   (c) adding to the reaction zone about 2 to 50% by weight of the total of a free-radical polymerization catalyst dissolved in a solvent;
   (d) continuously feeding to the reaction zone the remainder of the monomers and catalyst; and
   (e) cooling the reaction product and then adding ammonia or a water-soluble organic amine after the polymerization is complete to adjust the pH to about 7 to 10.